United States Patent [19]

Svub et al.

[11] 4,187,134
[45] Feb. 5, 1980

[54] PROCESS FOR MAKING A GAME BALL

[75] Inventors: Věroslav Švub; Milan Burian, both of Prostějov; Vladimír Uruba; Zdeněk Figalla, both of Gottwaldov, all of Czechoslovakia

[73] Assignee: GALA, narodni podnik, Prostejoy-Krasice,, Czechoslovakia

[21] Appl. No.: 895,360

[22] Filed: Apr. 11, 1978

[30] Foreign Application Priority Data

Apr. 13, 1977 [CS] Czechoslovakia .................. 2406/77
Apr. 13, 1977 [CS] Czechoslovakia .................. 2408/77

[51] Int. Cl.² .................................... B65H 81/00
[52] U.S. Cl. ................................ 156/170; 156/186; 156/147; 273/58 BA; 273/58 J; 273/65 EB; 273/65 ED
[58] Field of Search ............... 156/186, 445, 146–147, 156/170; 273/58 BA, 58 J, 65 EB, 65 ED

[56] References Cited

U.S. PATENT DOCUMENTS

| | | | |
|---|---|---|---|
| 2,211,669 | 8/1940 | Reach | 156/147 |
| 2,305,409 | 12/1942 | Crowley | 273/65 EB |
| 2,494,796 | 1/1950 | Brown | 273/65 EB |
| 2,579,294 | 12/1951 | Brown | 156/186 X |
| 2,687,303 | 8/1954 | Henderson | 273/65 E |

*Primary Examiner*—David A. Simmons

[57] ABSTRACT

A molded game ball, particularly for volley-ball, hand ball and soccer is made by winding a layer of fibrous material on an inflated rubber bladder, applying a sheet of a rubber mixture with a vulcanizing agent on this layer, imprinting in a cold mold a network of fields on this layer indicating places where cover segments have to be bonded thereon so that do not get in touch one with another on their periphery and by finally pressing this semiproduct with bonded cover segments in a smooth mold at temperatures for vulcanizing.

6 Claims, 5 Drawing Figures

U.S. Patent Feb. 5, 1980 4,187,134

PROCESS FOR MAKING A GAME BALL

BACKGROUND OF THE INVENTION

The present invention relates to a process for making a molded game ball particularly for volley-ball, hand ball and soccer, with a network of rubber ribs between individual cover segments upon the surface of the molded game ball, the carcass of which is wrapping an inflated rubber bladder with a textile layer or in winding thereon strands of ropes, yarn, threads or filaments to form the so called bag.

Among the most important properties of game balls, which are being manufactured by the molding process, one may, from the viewpoint of their appearance, count the distinctly showing outline network of ribs from rubber, which are quite accurately limiting the fields of individual cover segments; these are mostly made of natural or synthetic leathers, adhesive bonded to the specifically adapted carcass of the inflated rubber bladder. This type of game balls has been increasingly asserting in the past years with athletic games; this on the other hand influences also the manufacture of the game balls owing to the fact, that the relatively simple manufacturing process has proved to be much cheaper than the manufacture of analogous game balls, made heretofore by the classical method of manually sewing the outer cover of the game balls from individual leather segments.

The utility properties of the molded game balls are mostly characterised as satisfying; however, it is more or less of prestige reasons that the manufacturers of the molded game balls are aiming towards the manufacture of molded game balls, which would to a maximum degree, not excluding even the overall appearance thereof, suggest the appearance of the classical, manually sewn game balls. This aim of the manufactures, or in other words, this prestige component, has, after all, an effecting influence even on the sportsmen themselves when, at the athletic games, they are using the molded game ball.

To form the aforementioned rubber ribs on the surface of the molded game balls, several manufacturing methods have been proposed so far. According to the manufacturing process disclosed in Czechoslovakian Pat. No. 135,824, to the game ball bag, that is to the inflated inner rubber bladder which has been coated with a textile coating, rubber bands of the ribs are adhesively bonded to selected positions, the final form and the distribution thereof are finally given by putting the bag into a mold and by heat pressing them therein, during which the rubber material of the ribs is vulcanised. Thus, the ribs formed are limiting the individual fields for adhesive bonding to the cover segments. A substantially analogous manufacturing process is to be assumed also from the study of the French Pat. No. 1,488,920, although here, the precise process for the manufacture of the rubber ribs has not been clearly disclosed. The U.S. Pat. No. 3,887,416 discloses the adhesive bonding of the ribs, made of rubber, which has been vulcanised in advance. Manufacturing processes are also known (U.S. Pat. Nos. 3,653,818 or 2,219,078), according to which rubber ribs are made, the height of which reaches over the height of the cover segments. As admitted even by the manufacturers of these game balls, the game balls provided with rubber ribs of this type have proved to be unsatisfying, because if the ribs extend little beyond the surface of the ball, they do not enable a reliable gripping of the game ball into the hands of the player on the one hand, while on the other hand, if they extend substantially beyond the surface of the ball, they negatively influence the bounce properties of game balls.

The mutual disadvantage of all of the described manufacturing processes may, above all, be seen in the comparatively complicated manufacturing procedure, which is this way becomes needlessly expensive, much to the detriment of the remaining manufacturing steps of the manufacture of the molded game balls.

SUMMARY OF THE INVENTION

It is therefore the main aim of the present invention to remove the aforementioned disadvantages in making the network of rubber ribs between the individual cover segments upon the surface of molded game balls in using a method according to the present invention which is characterized in that a sheet of from 0.4 to 1.5 mm in thickness is applied around the bag of fibrous material, the sheet being made of a rubber mixture with admixture of from 2.7 to 3.6 percent by weight of a system accelerating agents for vulcanisation, the said system comprising mercaptobenzthiazole, tetramethylthiuram disulphide, and N,N'-diphenylguanidine, and from 0.2 to 0.4 percent by weight of iso-butylidene-bis-4,6-dimethyl phenole, the sheet is thereafter imprinted in a cold mold with a network of traces, determining places for adhesive bonding of cover segments thereon, the cover segments being adhesive bonded in such a manner as not to get into touch one with another in any point on the periphery thereof, whereupon the game ball is pressed in a smooth mold for a period of from 1.5 to 10 minutes at temperatures ranging between 90° and 150° C. According to a specifically advantageous embodiment of the present invention, the sheet of the rubber mixture is applied to the game ball bag in two steps, in the first step the rubber sheet being applied in the form of two spherical caps, which are positioned accurately opposite one another with leaving a free central stripe on the bag, to which the said rubber sheet applied thereupon in the second step.

It is furthermore advantageous, if the external part of the game ball can be separated from the rubber bladder, so that the rubber bladder can be removed for reparation or exchange. This is accomplished by bonding the layer of fibrous material with the rubber bladder in the course of application of this layer by means of an adhesive, enabling such a separation.

The technical effect of the method according to the present invention becomes manifest, first of all, in a considerable simplification of the game ball manufacture which, in turn, results in a reduction of the production costs. The network of rubber ribs, which is formed during the vulcanisation and the ironing steps of the game ball manufacture, originates from the flowing or creeping of the sufficiently viscous rubber mixture, which upon flowing fills the gaps between the individual cover segments. The formation of this network of the rubber ribs takes place during a single manufacturing step, with omission of the time-consuming previous applying and adhesive bonding of the specific rubber mixture stripes, eventually of a previously vulcanised rubber strips. The rubber ribs represent clearly limiting elements for the cover segments upon the game ball surface and they are a perfect equivalent of those rubber ribs, which have been so far made with the use of much more complicated, and financially more expensive manufacturing processes.

The utility properties of the game balls with the rubber ribs made by the method according to the present invention, are also largely improved, especially as far as the bounce and flight control of the game ball are concerned, after its take off from the sporting hall floor or from other play grounds.

DESCRIPTION OF DRAWINGS

In the attached drawings the individual steps of the process of making molded game balls is indicated, whereby.

DESCRIPTION OF PREFERRED PROCESS

Figure 4:
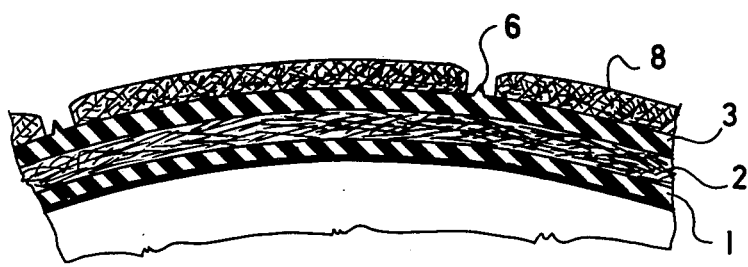
FIG. 4 a sectional view of a part of the ball prior to vulcanizing.

The game ball in the embodiment according to the present invention may be, as an example, manufactured as follows. Using a hollow steel needle, a rubber bladder (1 in FIG. 4 and 5) is inflated by means of pressurized air. The rubber bladder is fixed in a template and it is inflated to the desired maximum perimeter. Thereafter, the inflated rubber bladder is fed into a machine, in which the deposition of the ropes, yarn, threads or filaments of the windings upon the bladder surface is performed.

Figure 1:
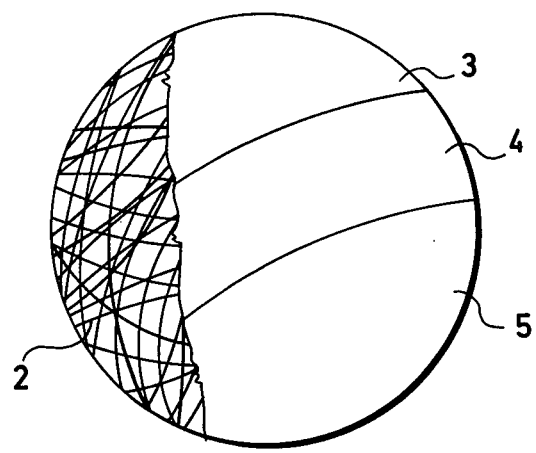
FIG. 1 shows an inflated rubber bladder with a layer of fibrous material indicated on the left part, and a subsequent layer of a rubber material on the right part.

The winding is oriented into all directions, so as to achieve a regularly deposited thick network of windings upon the surface of the bladder, while, of course, the continuous curve of the individually deposited ropes, yarn, threads or filaments follows substantially always the path of the great circle of the circumference of the inflated bladder surface. In FIG. 1 this fibrous material is indicated by reference number 2. The individual ropes, yarn, threads, or filaments may be preferably of synthetic materials, such as for instance of polyamide fiber PA-100/24/N, or of natural fibers, which may be taken into account, such as cotton yarn 68/2×2. Preferably a combination of synthetic and natural ropes, yarn, filaments or threads is used; so for instance it is of great advantage to use for the preparation of the complete winding three strands of a synthetic material and one strand of a cotton yarn. The ropes, yarns, threads or filaments of the synthetic material pass prior to being deposited upon the surface of the inflated rubber bladder, through a solution or a dispersion of material with adhesive properties, whereby their unchanging position upon the bladder surface is secured or anchored immediately.

When a greater number of synthetic ropes, yarn, threads or filaments is wound around the surface of the inflated rubber bladder simultaneously, the coating of the solution or dispersion of materials with adhesive properties must not be coated upon all of the strands; it has proved as sufficient, if the dispersion or the solution is coated at least on the prevailing majority thereof. With natural materials, the suction capacity of which is much greater than that of the synthetic materials, the coating of materials with adhesive properties is not performed. For the local stabilisation of the winding strands, which do not contain the coating of the adhesive materials, a certain "excess" thereof is sufficient, which adhered to the winding strands, which have been deposited from the fibers of synthetic materials with reduced suction capacity.

For the coating of the material with adhesive properties upon the ropes, yarn, threads or filaments, from which the windings are deposited around the inflated rubber bladder, solutions of rubber may be used in organic solvents, it is, though, much more advantageous to use aqueous dispersions of rubber-like materials, which do not only possess the adhesive properties, but at the same time, they do not contaminate the environment with vapours of organic solvents used, the latter being mostly of a toxical character. Such, for instance, it is very suitable to use a 60 percent aqueous dispersion of a pre-cured natural rubber; the dispersion has to be diluted to approximately a 40 percent solids content before the use and prior to passing the winding strands therethrough.

The ropes, yarn, threads or filaments are fed from a coil, mounted on a winding machine, via a system of guide members, either through a container filled with a solution or a dispersion of materials with adhesive properties, or outside this container, all the way to the inflated rubber bladder; to the surface of the inflated rubber bladder, the ropes, yarn, threads or filaments are pressed by means of a special roller, which controls the rotating of the bladder at the same time. The purpose of winding the ropes, yarn, filaments or threads upon the surface of the inflated rubber blade with the use of the method according to the present invention, in which a predominant majority of the strands being wound is coated with a coating of material exhibiting adhesive properties, is to immediately lock the position of the winding strands on the appropriate position of the bladder surface without fear of an eventual shifting of the position thereof during later manufacturing steps.

At the same time, absorption of the excess material with adhesive properties takes place, as a result of strands of the natural fibers used, in which way use is made of the sorption properties thereof. The combined winding of the synthetic and natural fibers by the method according to the present invention, removes an undesired agglomeration of the adhesive dispersion particles at the crossing points of the fibers, just as well as the formation of undesired solids particles, which in the case of their eventual occurrence, form projections upon the surface of the game ball bladder in the final phase of the winding step.

The overall quantity of the ropes, yarn, filaments or threads, necessary for completion of the reinforcing winding of a single game ball, equals to from 10,000 to 20,000 meters; to this corresponds also the consumption of the adhesive materials, related to solids content, equaling to approximately from 4 to 10 grams. The suitable material of this type is the 40 percent dispersion of natural rubber, sold commercially under the Trade MarK Revertex LR.

The rubber bladder with the winding of fibrous material which has been prepared by the method according to the present invention, is thereafter dried for about 30 minutes, in order to evaporate the substantial portion of the water content. Thereupon, ironing of the bladder is done in a smooth mold, the diameter of which is slightly enlarged, when compared with the diameter of the inflated rubber bladder, the enlargement corresponding substantially to the value, which equals to the thickness of the windings deposited upon the bladder surface.

Such for instance, when the diameter of the inflated rubber bladder equals to 198 mm, the smooth ironing mold has the diameter of 201 mm, while for the inflated rubber bladder of 200 mm diameter, an ironing mold will be used of 204 mm diameter. Temperatures ranging from 110° C. to 100° C. are used for the ironing step. The ironing step has the effect of local stabilization of the fibrous material in the previously acquired pattern, or rather terminating of the local stabilization upon the surface of the inflated rubber bladder with simultaneous vulcanisation, eventually coagulation of the adhesive dispersion used; in the ironing step, the remaining portion of the humidity from the ironed game ball carcass is evaporated completely. The carcass is thereafter let to cool, and it is then passed towards the further manufacturing steps.

The appropriately inflated bag of the game ball provided with the reinforcing layer of the thread or rope windings, and thereafter calibrated by the previous ironing operation, is clamped around the periphery of the parting plane, whereupon one, or both of rubber sheet segments, is or are simultaneously applied upon the game ball bag, which had been previously coated with a thin layer of an adhesive of the same composition as is the adhesive used for the application on the sheet segments.

Owing to the elasticity of the rubber sheet segments, the same are appropriately shaped to substantially acquire the shape of the game ball hemisphere as a result of depressing down the circular clamping rings to cover the game ball upon the surface of the bag, with the rubber sheet reaching only to the desired distance from the game ball parting plane, with no folds occuring during application thereof. As the rubber sheet segments are provided with the adhesive coating on the reverse side, the sheet is anchored upon the game ball from both sides in precise positions forming caps 3 and 5 (FIG. 1), which are determined by the circular clamping rings. Then both of the sheet caps 3 and 5 are cut around the peripheries thereof, whereby an uncoated strip is left in the central part of the game ball bag between both caps 3 and 5 around the maximum circle of this circumference; to the same is thereafter applied another segment of the rubber sheet, which has been previously formed into a strip 4 of the suitable width. The periphery of the rubber sheet strip 4 must be applied accurately between the peripheries of both of the previously applied cup segments 3 and 5, as the peripheries of the rubber segments must not be overlapping in any place.

For the reliable manufacture of the rubber rib network between the individual cover segments upon the molded game ball surface in using the method according to the present invention, it is of importance that the sheet from the rubber mixture, which is being used as an intermediate layer for joining the layer of fibrous material on the inflated rubber bladder, the so called bag, with the surface cover segments, is of a proper composition. Substantially, this sheet is made of a mixture of natural rubber and of synthetic rubber, eventually of their mutual mixtures, with an admixture of accelleratores, fillers, antioxidizing agents, lubricating agents, dyestuffs, and of the remaining necessary components.

For the respective needs of the method according to the present invention, this mixture must have a built-in vulcanising system contained therein, which corresponds to the requirements of the final ironing of the game ball, namely the temperature range of from 100° C. to 130° C. for a period of from three to maximum five minutes at the pressure of five atmospheres. Under the given conditions, the rubber mixture is vulcanised to such an extent, that the rubber ribs are resistant against deformations, which might eventually result from the handling of the game balls when used.

Figure 2:
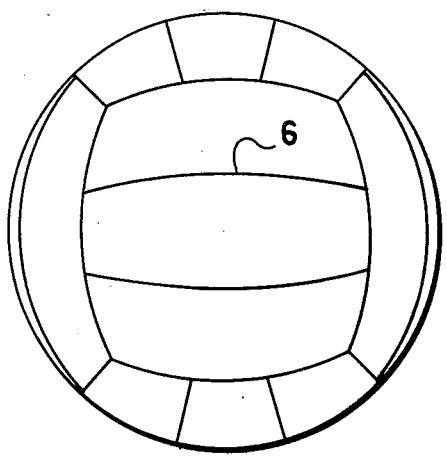
FIG. 2 is a semiproduct of the ball with markings on the rubber foil, indicating where the cover segments have to be applied.
Figure 3:
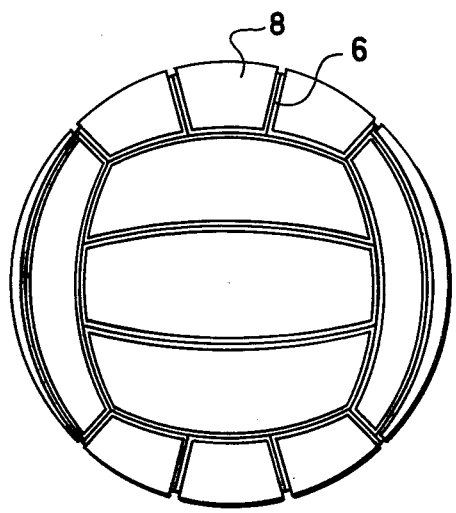
FIG. 3 shows a semiproduct of the ball with cover segments prior to vulcanizing.
Figure 5:
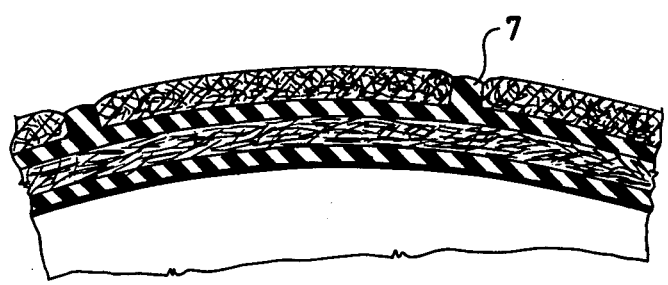
FIG. 5 the same view after vulcanizing in a press has been performed.

The sheet of the rubber mixture for the manufacture of the rubber ribs must especially be capable of uniformly covering the globe surface, that is to say, the inflated rubber bladder wrapped with the reinforcing winding without the occurence of the undesired folds around the peripheries of the adjoining edges; it must therefore exhibit sufficient degree of elasticity. In flowing into the grooves of the marking mold, it must provide reliable traces (6 in FIG. 2) for marking the positions of the surface cover segments (8 in FIG. 3) to be subsequently applied; it must therefore exhibit sufficient viscosity. It must secure vulcanisation, eventually gelatination at temperatures, which do not excede the limits of the temperature resistance of the surface cover segments 8 used; it must therefore contain a suitable vulcanisation system built-in therein. It must be capable of sufficient flowing into the gaps between the bonded surface cover segments 8 during the steps of the vulcanising and ironing to form rubber ribs 7 (FIG. 5). The viscosity of the rubber mixture must therefore be sufficiently high, even to suit to this important operation. Finally, when varying the properties of the rubber mixture sheet and the quantities thereof applied, one may not only influence the weight of the game balls, but also the final utility properties, especially the elasticity of the game ball.

The sheet of the rubber mixture for the manufacture of the rubber ribs 7, or rather the network of the rubber ribs 7, between the individual cover segments 8 upon the surface of the molded game balls in using the method according to the present invention, contains a vulcanising system which comprises from 2.7 to 3.6 percent by weight of a mixture of vulcanisation accelerators, namely the mixture of mercaptobenzthiazole, tetramethylthiuram disulphide, and N,N'-diphenyl guanidine, along with from 0.2 to 0.4 percent by weight of isobutylidene-bis-4,6-dimethyl phenole. The thickness of the rubber sheet ranges for the purposes of the method according to the present invention from 0.4 to 1.5 mm.

A typical example of a mixture for the preparation of the rubber ribs 7 in using the method according to the present invention is such a mixture, which, related to 1000 parts by weight, contains 185 parts by weight of natural rubber, 7 parts by weight of butadiene-styrene copolymer rubber, 7 parts by weight of sulphur, 8 parts by weight of zinc oxide, 5.5 parts by weight of marcaptobenzthiazole, 7.2 parts by weight of tetramethylthiuram disulphide, 15 parts by weight of N,N'-diphenyl guanidine, 2 parts by weight of isobutylidene-bis-4,6-dimethyl phenole, 4 parts by weight of stearine, 50 parts by weight of carbon-black, and 429 parts by weight of calcium carbonate.

The rubber mixture for the use by the method according to the present invention may be prepared in many modifications, and in various color shades. Use may be made also of thermoplastic rubbers, and even of suitable plastics materials. When preparing the rubber mixture, one does not procede in the conventional manner; rather specific manufacturing steps and temperatures have to be observed when preparing the rubber mixture. The same holds also for the sheet made from this mixture. The rubber batch is prepared conventionally in a two-roller calender, whereupon the accelerators and sulphur are admixed to the mixture in precisely selected quantities, while keeping the operation temperatures at minimum values. After the rubber mixture, containing the vulcanisation agents has been prepared in the two-roller calender, it is transferred immediately into a four-roller or a five-roller calender in several successive doses, where it is calendered into the sheet of desired thickness.

The temperature of the mixture upon the calender must not excede 60° C. The thus prepared sheet is thereafter cut into desired segments. The application of the sheet upon the game ball bag in making the rubber ribs by the method according to the present invention is as follows. The prepared segments, that is to say, the circles of desired diameter, are clamped by means of a specially designed equipment, whereupn a coating of a diluted adhesive is applied thereon. The sheet may also be activated by means of a suitable organic solvent, such as for instance gasoline.

In this way, a uniform application of the rubber sheet around the whole plane of the game ball sphere is achieved. Thereafter, the profile of the game ball is marked in marking traces 6 for the precise positions of the surface cover segments 8 to be applied upon the prepared bag of the game ball, provided with a coating of the rubber sheet. This is done in pressing the game ball bag in a mold, provided with grooves of desired depth and form, which secure the characteristic design of the final game ball surface. The said pressing is done under conditions of mild temperatures. Owing to the viscosity of the rubber sheet mixture, the softened mixture flows into the grooved mold parts, which results in precise marking of the fields for the future application of the surface cover segments. The game ball bag prepared in this way is then further processed by adhesive bonding the surface cover segments and by ironing, eventually by vulcanising the rubber sheet to form the rubber ribs in using the process according to the present invention.

First, the surface cover segments 8 of the desired shape are cut from natural leather, eventually from synthetic materials, using a cutting machine; the peripheries of these segments are skived on the reverse sides on a skiving machine to the width of about 6 mm, the skiving width itself depending on the character of the cover material and on the game ball type, as has been previously stated, the skiving is done from the reverse side of the segments 8. Thereafter, a coating of an adhesive is applied on the reverse side of the segments, and also on the surface of the game ball bag. The adhesive used is a solution of natural rubber, vulcanisation agents and dyestuffs with fillers, dissolved in an organic solvent, such as in gasoline.

When applying the coating of the adhesive to the reverse side of the cover segments, a solution of higher solids content is used, ranging from 18 to 20 percent. For the application of the adhesive to the game ball bag, a thinner solution with the solide content in the range of form 10 to 15 percent may be used.

The coating of the adhesive onto the reverse side of the cover segments is applied manually, however, a suitable coating machine may be used as well, and the adhesive, as has been already mentioned, is applied to the reverse side of the segments. To the game ball bag, the adhesive may also be applied manually; also in this case, a suitable adhesive coating machine may be used. After the adhesive has been coated to both of the surfaces to be adhesive bonded, the cover segments are applied upon the game ball bag, after an interval of from 5 to 45 minutes, in such a manner, as to precisely fit into the predetermined fields, which have been marked by the traces 6 of grooves of the marking mold, as has been described hereinbefore.

The shape of the game ball fields, just as well as the shape of the cover segments, are specific for each of the game ball type. When applying the surface cover segments 8 in using the method according to the present invention, no substantial physical effort is required for pressing of the segment peripheries in aiming to achieve the tight bonds.

A perfect adhesion between the game ball bag, the rubber sheet, and the cover material, results, as a matter of fact, from the sufficient flowing of the rubber sheet mixture and from its vulcanizing by the application of elevated temperatures during the ironing step. During this operation, the precise position of the surface cover segments is sufficiently stabilised, owing to the confection adhesive stability of the adhesive used. After the cover segments 8 have been applied, rests of the adhesive, eventually other impurities are removed from the game ball surface, which is thus prepared for the ironing. The following ironing and the vulcanisation of the game balls are performed in spherical molds, consisting of two spherical, closable hemispheres. The size of the mold is determined by the game ball type. The temperatures used and the ironing time of the game ball, just as the vulcanisation of the rubber mixture sheet, are depending upon the type of the cover material, and upon the temperature resistance thereof, the temperatures ranging from 90° to 130° C. In case synthetic materials are used with a high degree of resistance to elevated temperatures, even substantially higher temperatures may be used eventually. The ironing and the vulcanisation times are depending upon the temperatures used. Usually, the time ranges between 2 and 7 minutes; for the case of higher temperatures, the time may even be shorter. The purpose of the ironing step for the game ball is to achieve a smooth and uniform surface of the game ball, while keeping or securing its round shape.

In vulcanising the mixture, the formation of the rubber rib network is achieved by the method according to the present invention, owing to the perfect flowing of the softened mixture into the gaps between the peripheries of the cover segments 8. In the first phase, the mixture gets plasticised under the effect of heating, and in the second phase, a perfect bond between the cover segments and the sheet, and in turn, between the sheet and the game ball bag is achieved, as a result of vulcanising the mixture and the adhesive in the given state. Substantially higher degree of peeling strength between the cover segments and the game ball bag is achieved, just as well as a higher reliability of the bond itself. The peeling of the cover segment peripheries takes practically no more place at all, as was the usual case and appearance in some of the up to date known methods of manufacture.

To preserve the characteristic shape of the game ball surface, namely the graduation of the surface, resulting from the plastical composition of the cover segments 8 with lowered peripheries thereof, it is of importance to skive the surface cover segments. The skiving of the peripheries of the cover segments and the relatively high degree of overpressure inside the game ball during the ironing and the vulcanising steps, secure perfect sealing of the skived or bevelled peripheries into the sheet material, which results in a very tight bond. After the steps of the sheet vulcanising and the game ball ironing, the pressure inside the game ball bladder 1 is substantially reduced; the overpressure used during the operation of vulcanising and of ironing the game ball, will during the practical use of the game ball never be repeated.

At the substantially lower inflating pressure in the game ball, the surface thereof will practically get never smooth again, so that, owing to the skived peripheries of the cover segments, the game ball surface will preserve its typically articulate appearance. Should some of the game ball types require the surface to be perfectly round, with exclusion of the pronounced characteristics of the articulation resulting from the varying thickness of the cover segments, the aforementioned skiving of the peripheries of the cover segments is omitted. The game ball surface then keeps its perfectly round shape and appearance, without any plastical pronouncements of the individual segments. This pronouncement may then acquire only the optical appearance, while preserving the equally tight bond between the surface cover segments with the game ball bag. The abovementioned ironing having been terminated, the game balls are let to cool and thereafter, they are inflated to the required pressure for the air-tightness checking. The finished game balls are despatched in the inflated, or in an emptied state.

EXAMPLE

A rubber bladder 1 is prepared, which is inflated to the diameter of 196 mm in such a manner, as to guarantee the required roundness within the plus and minus tolerances of 2 mm. The surface of the bladder 1 is reinforced with a yarn winding 2 on a specifically manufactured winding machine. To accomplish the winding, a strand of the yarn is manually anchored to the bladder surface with subsequent winding thereof around the bladder, whereupon the winding step procedes automatically, using the mentioned winding machine. The path of the yarn wound on the rubber bladder follows always the maximum circumference of the bladder, with four strands being wound simultaneously. Out of these four strands, three are of polyamide yarn of the commercial mark PAD-100/24/N; two strands of the polyamide yarn pass through a latex bath, whereby sufficient adhesion of the yarn to the bladder surface, eventually to the previously wound layers of the winding is secured. The remaining strand of the polyamide yarn, and one strand of natural silk, are wound simultaneously with the previously mentioned two strands of the polyamide yarn, without of course passing the former through the latex bath. This is to prevent an excess sorption of the latex adhesive onto the yarn in connection with the polyamide yarn; as far as the cotton yarn is concerned, this secures a uniform distribution of the moisture and of the latex solids across the winding surface. This distribution of the moisture and of the adhesive is secured by the sorption property of the natural fibers, eventually of the fibers of regenerated cellulose.

In the present embodiment of the game ball, the time necessary for completion of the winding, equals to 12.5 minutes. This time is not only sufficient for the completion of the winding in the required quantity of the yarn, but at the same time, for covering the whole surface of the bladder, as a result of which, the desired strength and shape stability of the finished game ball are achieved. In this example, the adhesive used is a 20 to 25 percent precured latex of the type Revultex LR. After the winding 2 of the inflated bladder 1 is terminated, the water content from the adhesive evaporates freely for about 30 minutes, whereupon the winding is ironed in a smooth mold, heatd to temperatures ranging from 100° to 110° C. for about one minute, using the pressure of five atmospheres.

Onto the ironed game ball bag, made by winding a mixture of synthetic and of natural yarn on an inflated rubber bladder, a layer of an adhesive is coated in the form of a 20 percent solution of natural rubber in gasoline. The same coating of the adhesive is simultanneously applied to one of the surfaces of the rubber sheet with a thickness ranging from 0.5 to 0.6 mm, which is then clamped in a special tool, designed for applying the sheet upon the round, inflated game ball bag. The sheet is applied after from 20 to 30 minutes have elapsed since coating the adhesive.

The successive individual steps of the rubber mixture sheet application consists in centering two sheet hemispheres, which are then formed during the applying, to caps 3 and 5 and in applying a central strip 4 of the sheet, which compensates the eventual irregularities that might have occured during the application of the hemispheres. The application of the central sheet strip 4 to the aforementioned hemispheres is made carefully, to prevent overlapping of the individual caps 3 and 5, as the surface of the finished game ball would show irregular projections in those points.

After the sheet has been applied onto the game ball bag, the pressing of the same takes place in a profiled cold mold, to uphold the bonding between the sheet and the game ball bag by the pressing step, and eventually to mark orientation points and grooves by traces 6 upon the bag surface, in order to make the later application of cover segments easier.

The ironed game ball bag is provided with a coating of an adhesive of the type of a 20 percent solution of natural rubber in gasoline. Simultaneously, the reverse side of the cover segments 8 is coated with the same type of the adhesive, with two coats following one after another. After minimum 30 minutes have elapsed since applying the coating of the adhesive, the same has dried, and the cover segments made of natural leather are bonded onto the prepared game ball bag.

Thereafter, the cover segments 8 having been applied, the game ball is conditioned at least for one hour with subsequent ironing and vulcanisation of the same. The purpose of the ironing and of the vulcanisation is to correct or to smoothen eventual irregularities around the game ball surface, which might have occured during the bonding step of the cover segments, and during the vulcanisation of the rubber mixture. The ironing and the vulcanisation take place in a smooth, round mold of 20 cm diameter at temperatures in the range of from 100° to 110° C. for three minutes. After the game ball has been ironed, it is let to cool and after inflating to the required pressure in the inner rubber bladder, the game balls then pass after 24 hours for technical checking and to despatch.

What we claim is:

1. A process for making a molded game ball which comprises,
   (a) wrapping a layer of fibrous material around an inflated rubber bladder to form an inner body having a configuration corresponding to that of said bladder,
   (b) applying a rubber sheet having a thickness of between 0.4 to 1.5 mm around said inner body, said rubber sheet comprising a rubber composition containing from 2.7 to 3.6 percent by weight of a first accelerating agent and from 0.2 to 0.4 percent by weight of isobutylidene-bis-4,6-dimethylphenol, said weight percentages based on the weight of the rubber composition,
   (c) imprinting the applied rubber sheet with a pattern to serve as a guide for subsequent application of outer cover segments,
   (d) subsequently applying a plurality of discrete cover segments to said rubber sheet conforming to said pattern, the peripheral edges of all of said cover segments being slightly spaced one from another, thereby forming a series of grooves on the semi-finished game ball,
   (e) pressing the semi-finished game ball in a smooth mold for a period of from 1.5 to 10 minutes at temperatures ranging between 90° and 150° C., vulcanizing, plasticizing, and causing a portion of said rubber composition to flow into and substantially fill said series of grooves and to affect additional binding of said cover segments, and
   (f) thereafter cooling the game ball so produced.

2. A process according to claim 1 wherein the rubber sheet is applied to the inner body in two steps; in the first step the rubber sheet is applied in the form of two hemispherical caps, which are positioned accurately opposite one to another while leaving a free central strip on the inner body, in the second step a strip of the rubber sheet is applied to said free central strip.

3. A process according to claim 1 wherein the layer of fibrous material is bonded temporarily to the rubber bladder by an adhesive enabling a subsequent separation of the rubber bladder from the inner body.

4. A process according to claim 1 wherein the fibrous material wrapped on the rubber bladder is a combination of natural and artificial fibers.

5. A process according to claim 1 wherein the imprinting step (c) is carried out by clamping the partially constructed ball from step (b) in a marking mold having a pattern of grooves on the inner surface of said mold to form slightly extending protrusions on the surface of the rubber sheet corresponding to the pattern of grooves.

6. A process according to claim 1 wherein said first accelerating agent comprises a mixture of mercaptobenzthiazole, tetramethylthiuram disulphide and N,N'-diphenyl guandine.